(12) United States Patent
Knapp et al.

(10) Patent No.: US 6,872,303 B2
(45) Date of Patent: Mar. 29, 2005

(54) WATER TREATMENT CARTRIDGE

(76) Inventors: Ian M. Knapp, 384 Treeline Pkwy., Unit 1011, San Antonio, TX (US) 78212; David B. Morris, 741 Claudia La., Palm Harbor, FL (US) 34683

( * ) Notice: Subject to any disclaimer, the term of this patent is extended or adjusted under 35 U.S.C. 154(b) by 0 days.

(21) Appl. No.: 10/638,645

(22) Filed: Aug. 12, 2003

(65) Prior Publication Data

US 2005/0035040 A1 Feb. 17, 2005

(51) Int. Cl.$^7$ ............................................. C02F 1/68
(52) U.S. Cl. ................. 210/206; 210/754; 210/209; 210/266; 210/282; 210/443; 210/289; 210/455; 422/266; 422/278
(58) Field of Search ............................. 210/198.1, 206, 210/754, 209, 203, 266, 282, 435, 443, 450, 455, 289, 291; 422/266, 278

(56) References Cited

U.S. PATENT DOCUMENTS 3,627,133 A    12/1971    Rak
4,228,000 A    10/1980    Hoeschler
5,882,588 A    3/1999     Laberge
6,027,572 A    2/2000     Labib et al.
2002/0125182 A1 *  9/2002  Kijima ....................... 210/209

FOREIGN PATENT DOCUMENTS

EP    0 421 737        10/1990
GB    2 329 589         3/1999
JP    59154116 A   *   9/1984  ........... B01D/35/02

* cited by examiner

Primary Examiner—Duane Smith
Assistant Examiner—Douglas J. Theisen
(74) Attorney, Agent, or Firm—Richard C. Litman

(57) ABSTRACT

The water treatment cartridge is a cartridge adapted to fit into a conventional water filter housing to release a sanitizing dose of a water-treating chemical, and in particular chlorine dioxide, into a water treatment system or unit process. The cartridge is filled with a water treating media, comprised preferably of a mixture of an inert filler material and a chemical composition that releases chlorine dioxide on contact with water. The concentration of the chlorine dioxide released into the water, as well as the duration of the release, may be varied by the selection of the filler material and amount of the filler material in the water treating media.

5 Claims, 5 Drawing Sheets

WATER TREATMENT CARTRIDGE

BACKGROUND OF THE INVENTION

1. Field of the Invention

The present invention relates to water treatment and disinfection. More specifically, the invention is a water treatment cartridge that utilizes a dry powder that releases chlorine dioxide on contact with water. The powder is contained within a cartridge that is adapted to fit into a standard water system filter cartridge housing.

2. Description of the Related Art

It is a well-established fact of biological science that microorganisms flourish in dark, wet environments. Temperature has an effect, but normal ambient temperatures are adequate to promote biological growth. Such biological growth includes bacteria, virus, molds, mildews, cysts, fungi, and more.

By design, fluid treatment systems are closed, dark, wet environments that are highly suited to biological growth. Water treatment systems and facilities are of a primary concern.

Microorganisms enter water treatment systems from source water. No municipal, ground, or surface water is totally free of them. Once inside a water treatment system, the microorganisms flourish. Growth is only checked by the regular, systematic use of the system, which flushes out the microorganisms or allows a temporary influx of a disinfectant product. Municipal water systems are typically treated with a small amount of chlorine injected into the supply water.

Typical water treatment procedures, however, are not generally able to eliminate the microorganisms entirely. While growth may be checked, the microorganisms are able to survive, and to flourish to a greater or lesser extent as water conditions permit.

A critical device for the survival of the microorganisms is known as "biofilm". Biofilm forms as bacteria adhere to the walls of the pipes and containers in the water system. The bacteria excrete a slimy, glue-like substance that can anchor the bacteria to all interior surfaces of the water system and protect the bacteria from chemical attack. A biofilm can be formed by a single bacterial species, but more frequently a biofilm includes many species of bacteria, as well as fungi, algae, and more.

The biofilm can be attacked and reduced by chemical and other methods, but it is very difficult to eliminate. Because the biofilm is not generally eliminated, it provides the seeds for future microbial growth following treatment.

Chlorine dioxide ($ClO_2$) is one of the only substances known to eliminate biofilm. This attribute of $ClO_2$ makes it a preferred choice for sanitization. Unfortunately, until recently $ClO_2$ was both difficult and sometimes dangerous to produce, and needed to be produced at the point of use.

U.S. Pat. No. 3,627,133, issued on Mar. 16, 1970 to S. Rak, discloses a chlorine generator to be inserted in a fluid flow line between a water softener and a brine regenerant tank. The chlorine generator electrolytically generates chlorine to sanitize the water softener during a regeneration cycle.

U.S. Pat. No. 4,228,000, issued on Oct. 14, 1980 to F. Hoeschler, discloses a disinfectant feeder device that dispenses a predetermined amount of a disinfectant into a self-regenerating water treatment device at a predetermined time during regeneration cycles.

U.S. Pat. No. 5,882,588, issued on Mar. 16, 1999 to F. Laberge, discloses a process for disinfecting hot water supply systems. The disclosed process generally discloses introducing an ozone-containing gas into water drawn into a treatment tank. After the water is treated with the ozone-containing gas, the treated water is fed into the hot-water system.

U.S. Pat. No. 6,027,572, issued on Feb. 22, 2000 to M. Labib et al., discloses a method for removing biofilm and debris from fluid lines and tubing. Small-bore tubing is cleaned by passing an aqueous solution of water, one or more surfactants and preferably a source of hydrogen peroxide, and optionally small inert solid particles, along with a pressurized gas to create a turbulent flow within the tubing that loosens and flushes the biofilm and debris from the tubing.

The European Patent Application EP 0 421 737 A1 by P. Riplet, published on 10.04.91, discloses a method of generating chlorine dioxide which involves contacting a stable precursor with a transition metal in a buffered aqueous medium. Also disclosed are compositions containing the stable precursor and the transition metal.

The UK Patent Application GB 2 329 589 A by G. Littlejohn, published on 31.03.99, discloses a method of disinfection involving the production of chlorine dioxide by combining a chlorine dioxide source with a reagent.

None of the above inventions and patents, taken either singly or in combination, is seen to describe the instant invention as claimed. Thus a water treatment cartridge solving the aforementioned problems is desired.

SUMMARY OF THE INVENTION

The water treatment cartridge facilitates safe and easy chlorine dioxide treatment and sanitization of water systems. The water treatment cartridge is used in a conventional filter cartridge housing, placed either in-line or on an auxiliary bypass line, preceding a water treatment system. Such systems are various in nature and function, often referred to as "unit processes". By category, unit processes include filtration, softening, demineralization, reverse osmosis, nanofiltration, ultrafiltration, degasification, iron removal, neutralization, and other types of water processing systems. The water treatment cartridge has applicability to all of these unit processes. The water treatment cartridge is also contemplated for application to piping or plumbing systems alone without any intervening or intermediate water treatment equipment.

The water treatment cartridge is adapted to contain a water treating media, such as an active water-treating chemical compound along with an inert filler. The preferred active water-treating chemical compound is a chemical compound that releases chlorine dioxide upon contact with water. The water treating media is contained within the water treatment cartridge in a spill-proof manner so that the cartridge can be safely handled. The active water-treating chemical compound is reduced, by its use, to an inert material so the water treatment cartridge may be safely handled and disposed.

In use, the water treatment cartridge is placed in a water filter housing, replacing the conventional filter cartridge. As water flows through the filter housing, the water flows through the water treatment cartridge. The water treating media releases a water-treating chemical, such as chlorine dioxide, into the water.

Varying the amount and type of the filler material in the water treating media can vary the concentration of the water-treating chemical released into the water, as well as the duration of the release.

Accordingly, it is a principal object of the invention to provide a water treatment cartridge for sanitizing a water treatment system.

It is another object of the invention to provide a water treatment cartridge for sanitizing a water treatment system by introducing chlorine dioxide into the water treatment system.

It is a further object of the invention to provide a water treatment cartridge that is compatible with a standard and existing water filter housing.

Still another object of the invention is to provide a water treatment cartridge that is safe and easy to use.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
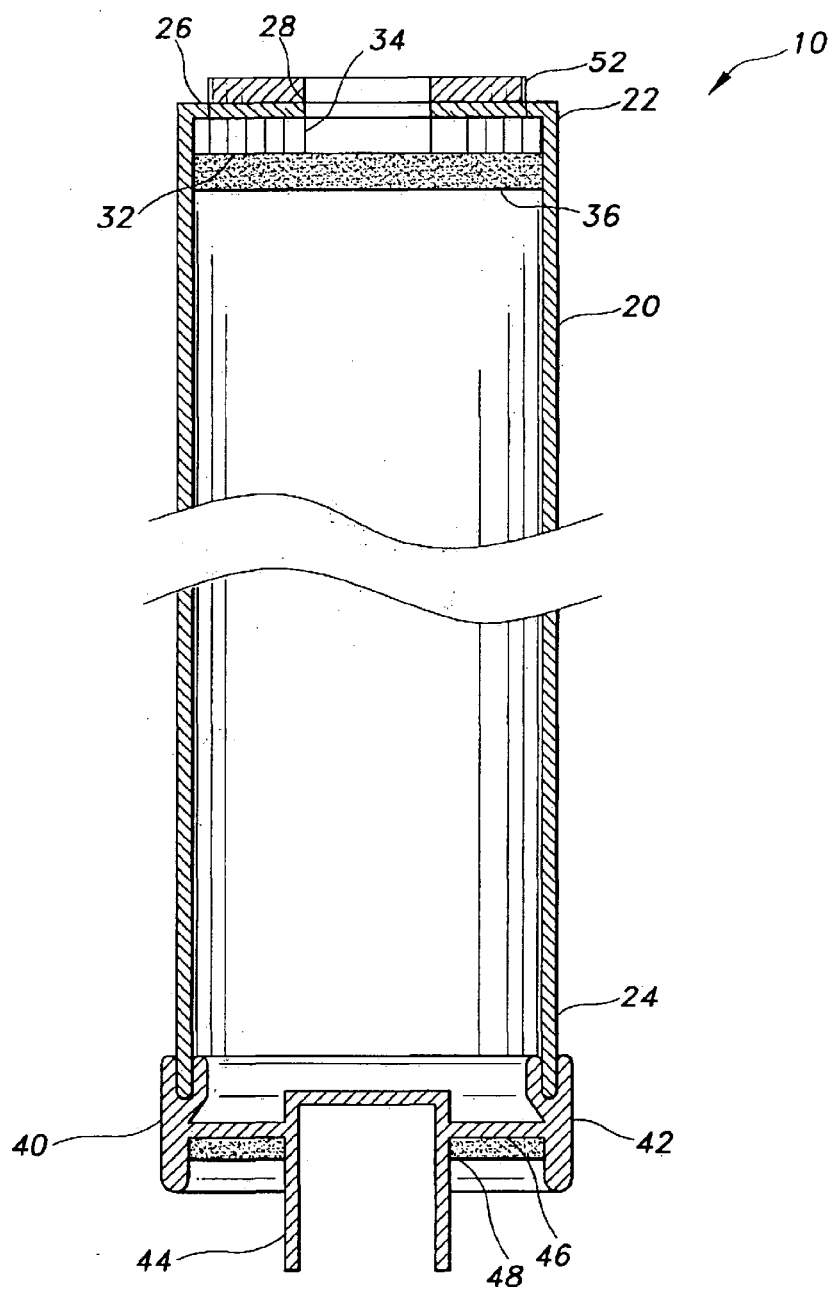
FIG. 1 is a cross section view of a water treatment cartridge according to the present invention.

The present invention is a water treatment cartridge, designated generally as 10 in the figures. The water treatment cartridge 10 is designed to fit into a conventional water filter housing, taking the place of a conventional water filter. The water treatment cartridge 10 is used to release a water-treating chemical into water that passes through the water filter housing and, thus, through the water treatment cartridge 10. In the preferred embodiment, the water treatment cartridge 10 is used to release chlorine dioxide ($ClO_2$) into water. It will become apparent, however, that the water treatment cartridge 10 can be used to deliver a great variety of different fluid treatment substances.

Referring to FIGS. 1–4, the water treatment cartridge 10 comprises a hollow cylindrical cartridge body 20 having a top end 22 and a bottom end 24. A top wall 26 closes the top end 22, while the bottom end 24 is open. A water outlet aperture 28 is formed in the top wall 26 to allow water to flow from the water treatment cartridge 10. A gasket 52 is disposed on the top wall 26 of the cartridge body 20.

An outflow filter disk 36 is disposed within the cartridge body 20 at the top end 22 of the cartridge body 20. A support shoulder 32, disposed within the cartridge body 20 next to the top wall 26, spaces the outflow filter disk 36 back somewhat from the top wall 26. The support shoulder 32 may be formed as an integral part of the cartridge body 20, or it may be a flat disk as illustrated. A water passage aperture 34 is formed through the support shoulder 32.

An end cap 40 disposed on the bottom end 24 of the cartridge body 20 has at least one fluid passage 47 defined therein. An inflow filter disk 48 is supported on the end cap 40, covering all of the fluid passages 47.

Figure 2:
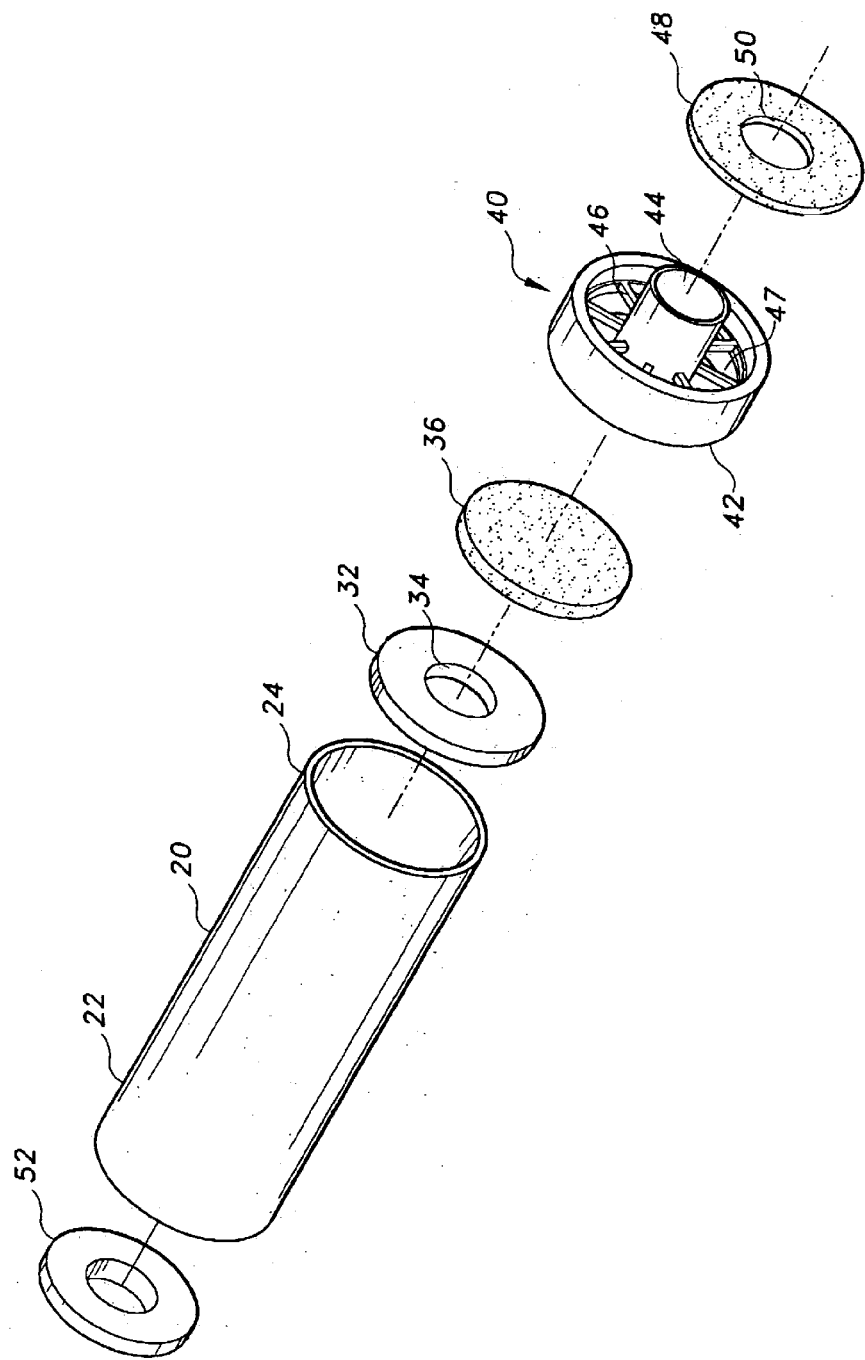
FIG. 2 is an exploded, perspective view of a water treatment cartridge according to the present invention.
Figure 3:
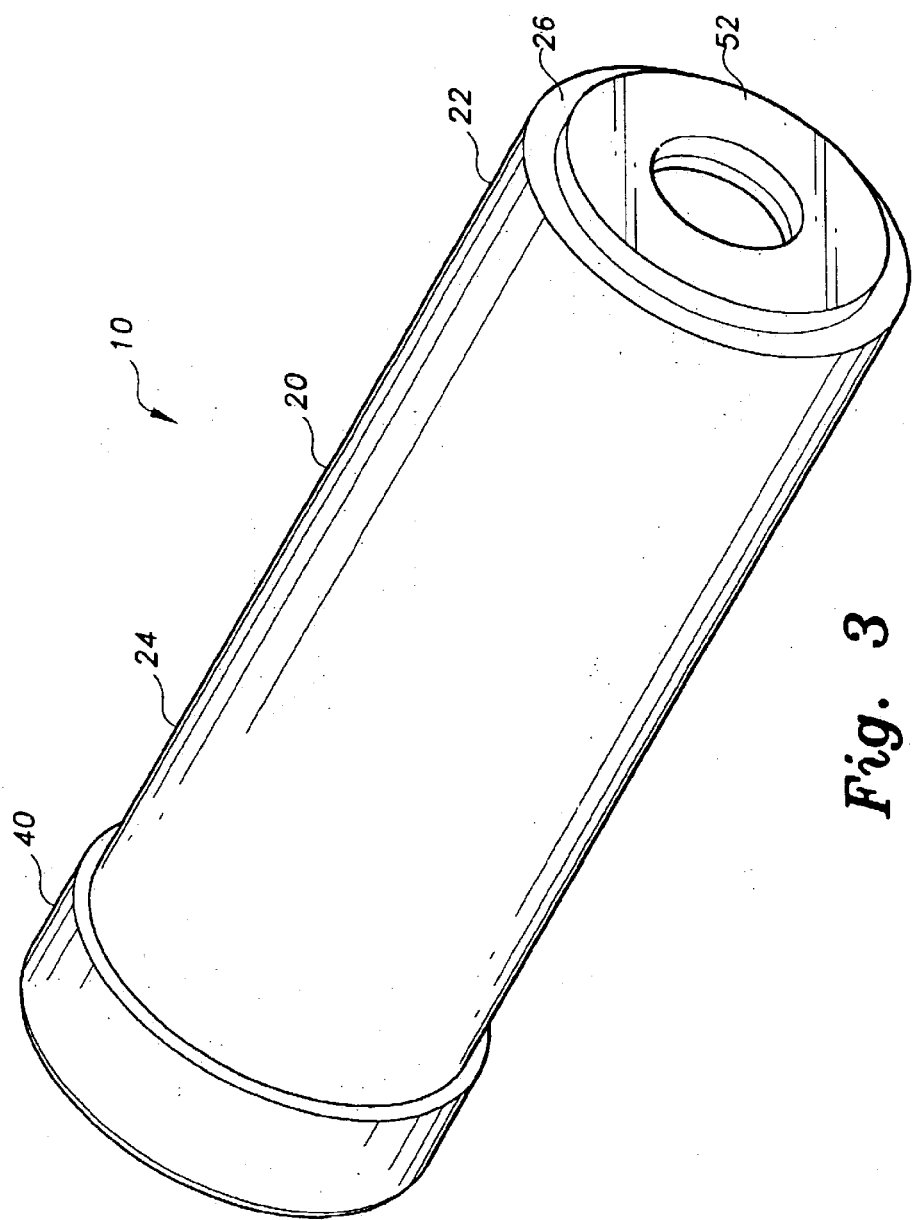
FIG. 3 is a perspective view of a water treatment cartridge according to the present invention, looking toward the top end.
Figure 4:
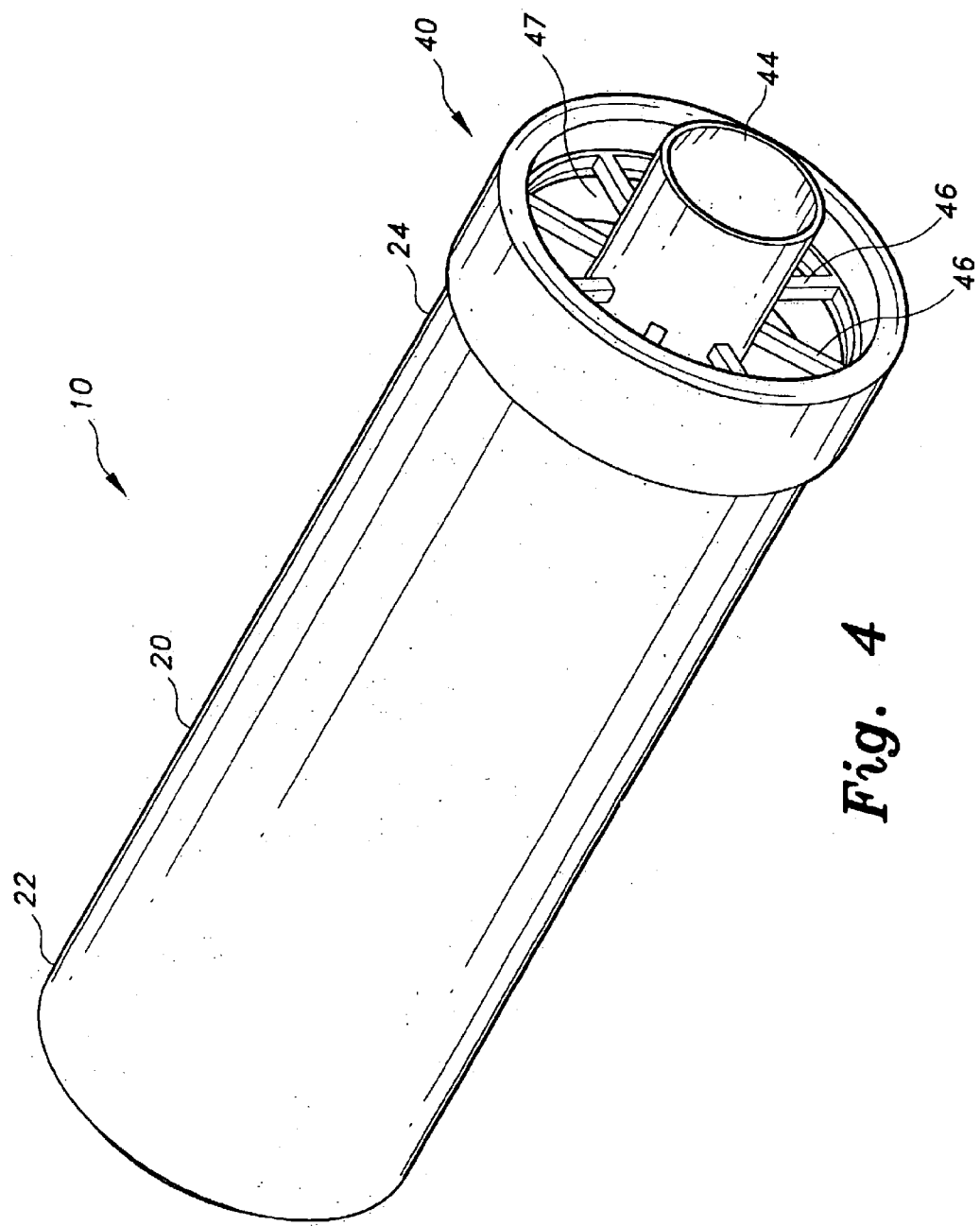
FIG. 4 is a perspective view of a water treatment cartridge according to the present invention, looking toward the bottom end.

In the illustrated embodiment, as best seen in FIGS. 2 and 4, the end cap 40 comprises an annular ring 42 that is affixed to the bottom end 24 of the cartridge body 20. A central cylinder 44 is rigidly supported within the ring 42 by a plurality of spokes 46. The central cylinder 44 has a closed top and an open bottom. The open bottom extends below the ring 42. The inflow filter disk 48 has a mounting aperture 50 so that the inflow filter disk 48 can be mounted around the central cylinder 44, covering the fluid passages 47.

Figure 5:
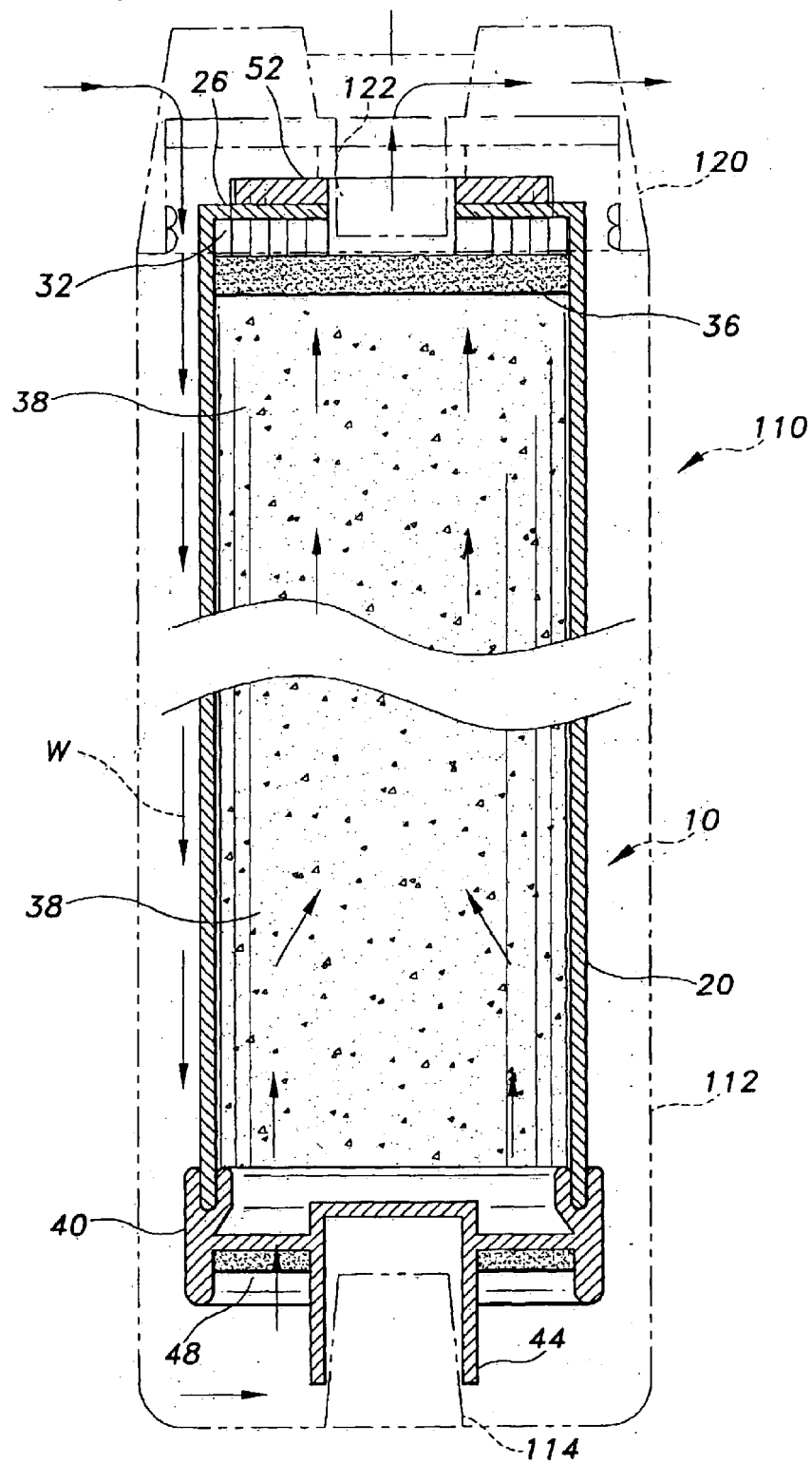
FIG. 5 is a cross section view of a water treatment cartridge according to the present invention, shown within a typical water filter housing.

Turning now to FIG. 5, the function and use of the water treatment cartridge 10 can be better understood. The water treatment cartridge 10 is filled with a water treating media 38. The water treating media 38 comprises at least one active water-treating chemical. The water treating media 38 may additionally comprise a filler material. In the preferred embodiment, the active water-treating chemical is a chemical composition having the property of releasing chlorine dioxide on contact with water. Various chemical compositions are known that release chlorine dioxide on contact with water. Several such compositions are made commercially available in a dry powdered or granular form. An exemplary chlorine dioxide producing composition is Perlox, manufactured by Bio-Cide International.

In use, the water treatment cartridge 10, filled with a water treating media 38, is placed inside a conventional water filter housing 110, in place of a conventional water filter. It can be seen that the central cylinder 44 fits over a post 114 that is found on the bottom of the sump 112 of the housing 110. A water outlet 122 found in the top 120 of the housing 110 fits into the top of the water treatment cartridge 10, extending through the gasket 52 and the top wall 26. It can now be seen that the support shoulder 32 functions to displace the outflow filter disk 36 beyond the end of the water outlet 122. The central cylinder 44 positions the end cap 40 of the water treatment cartridge 10 above the bottom of the sump 112, allowing water to freely flow through the fluid passages 47 and through the cartridge body 20. Arrows W indicate water flow.

As the water flows through the water treating media 38, the water-treating chemical is released into the water. The water, laden with the water-treating chemical, flows out the top of the water treatment cartridge 10, through the water outlet 122, and on to a water system being treated.

The inflow and outflow filter disks 48, 36 retain the water treating media 38 within the cartridge body 20, while allowing water to pass through, eliminating the danger of spillage of the water treating media 38. The water treatment cartridge 10 is thus safe and easy to handle.

The concentration of the water-treating chemical that is released into the water, as well as the duration of release, can be varied by the choice of inert filler materials, as well as by the amount of the inert filler material used in the water treating media 38.

The various chemical compositions used to produce chlorine dioxide on contact with water are rendered inert by their use, making the water treatment cartridge 10 easy and safe to dispose.

It is to be understood that the present invention is not limited to the embodiment described above, but encompasses any and all embodiments within the scope of the following claims.

We claim:

1. A water treatment cartridge, comprising:

a hollow cylindrical cartridge body having a top wall defining a closed top end and having an open bottom end, the top wall having a water outlet aperture formed therethrough;

a flat disk disposed within the cartridge body flush against the top wall and forming a support shoulder, the disk having a water passage aperture formed therethrough;

an outflow filter disk disposed within the cartridge body flush against the support shoulder;

an end cap affixed over the bottom end of the cartridge body, the end cap having at least one fluid passage defined therein adapted for a fluid to pass through the end cap into the cartridge body;

an inlet filter disk supported by said end cap, the inlet filter disk covering the at least one fluid passage defined in the end cap; and a water treating media contained within the cartridge body comprising at least one active water treating chemical, wherein said at least one active water treating chemical comprises a chemical composition having the property of releasing chlorine dioxide on contact with water;

whereby as a stream of water passes through the water treating media within the cartridge body, at least one water treating chemical is released into the water to treat a water system downstream from the water treatment cartridge.

2. The water treatment cartridge according to claim 1, further comprising an outlet gasket disposed on the top wall of said cartridge body.

3. A water treatment cartridge, comprising:

a hollow cylindrical cartridge body having a top wall defining a closed top end and having an open bottom end, the top wall having a water outlet aperture formed therethrough;

a flat disk disposed within the cartridge body flush against the top wall and forming a support shoulder, the disk having a water passage aperture formed therethrough;

an outflow filter disk disposed within the cartridge body flush against the support shoulder;

an end cap affixed over the bottom end of the cartridge body, the end cap comprising an annular ring affixed to the bottom end of said cartridge body, a hollow central cylinder having a closed top end and an open bottom end, and a plurality of spokes extending radially from said central cylinder to said annular ring, the spokes rigidly supporting said annular ring around said central cylinder, the spokes defining at least one fluid passage adapted for a fluid to pass through the end cap into the cartridge body;

an inlet filter disk supported by said end cap, the inlet filter disk covering the at least one fluid passage defined in the end cap; and a water treating media comprising at least one active water treating chemical contained within the cartridge body;

whereby as a stream of water passes through the water treating media within the cartridge body, at least one water treating chemical is released into the water to treat a water system downstream from the water treatment cartridge.

4. The water treatment cartridge according to claim 3, wherein said bottom end of said central cylinder extends below said annular ring.

5. A water treatment cartridge, comprising:

a hollow cylindrical cartridge body having a top wall defining a closed top end and having an open bottom end, the top wall having a water outlet aperture formed therethrough;

a flat disk disposed within the cartridge body flush against the top wall and forming a support shoulder, the disk having a water passage aperture formed therethrough;

an outflow filter disk disposed within the cartridge body flush against the support shoulder an end cap affixed over the bottom end of the cartridge body, the end cap having at least one fluid passage defined therein adapted for a fluid to pass through the end cap into the cartridge body;

an inlet filter disk supported by said end cap, the inlet filter disk covering the at least one fluid passage defined in the end cap; and a water treating media contained within the cartridge body, the water treating media comprising at least one active water treating chemical and an inert filler material;

whereby as a stream of water passes through the water treating media within the cartridge body, at least one water treating chemical is released into the water to treat a water system downstream from the water treatment cartridge.

* * * * *